United States Patent

[11] 3,570,405

[72] Inventor Paul A. Heady, Jr.
 Felton, Calif.
[21] Appl. No. 755,012
[22] Filed Aug. 23, 1968
[45] Patented Mar. 16, 1971
[73] Assignee The United States of America as represented by the Secretary of the Air Force

[54] EXIT CONE PYROGEN ROCKET IGNITER
1 Claim, 1 Drawing Fig.
[52] U.S. Cl................................................. 102/70.2,
 60/256, 102/49.7
[51] Int. Cl..................................................... F02p 23/00
[50] Field of Search............................................ 102/49.7,
 70.2; 60/39.81 (E), 256

[56] References Cited
UNITED STATES PATENTS
2,440,271 4/1948 Hickman...................... 102/49.7X
2,627,160 2/1953 MacDonald................... 60/256
3,017,748 1/1962 Burnside....................... 60/251
3,461,672 8/1969 Harris et al.................... 102/49.7

Primary Examiner—Verlin R. Pendegrass
Attorneys—Harry A. Herbert, Jr and Arsen Tashjian ABSTRACT: A pyrogen igniter assembly for use with a solid propellant rocket motor. The igniter assembly, which fits at, and within, the exit cone portion of the divergent type nozzle of the main rocket motor, comprises an igniter charge of the solid grain type bonded to a burst disc having a plurality of ports therein. The igniter charge has a centrally located port, at the end of which is positioned an electrically activated initiator embedded in a pyrotechnic charge. Upon application of current, the initiator ignites the pyrotechnic charge which, in turn, ignites the internal surface of the igniter charge. The resultant back flow of gases toward the burst disc ports ignite the outer surfaces of the igniter charge. The main propellant charge of the rocket motor is thus subjected to the hot combustion gas, the radiant energy, and the hot solid particles of the igniter charge and, therefore, ignites.

Patented March 16, 1971 3,570,405
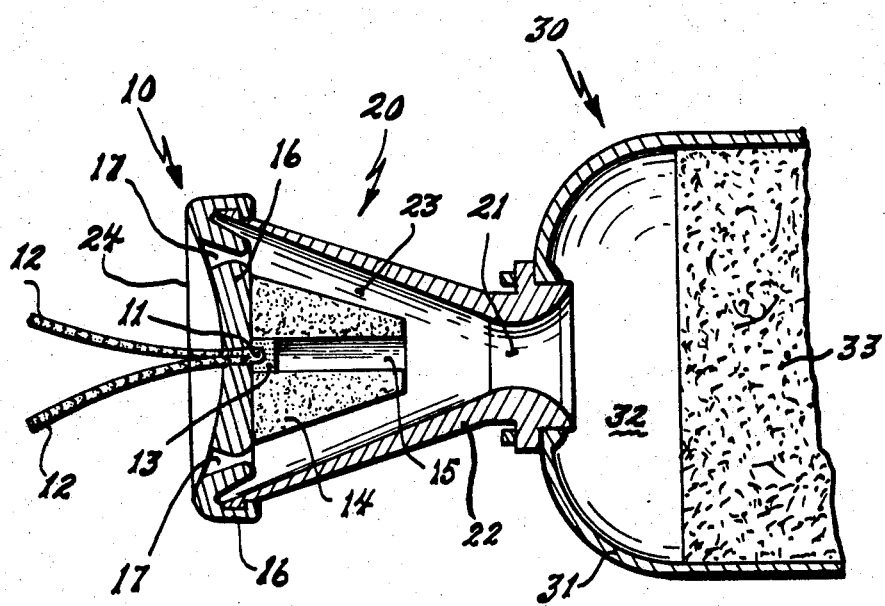
INVENTOR.
PAUL A. HEADY JR.
BY Harry A. Herbert Jr.
and
Arsen Tashjian
ATTORNEYS

3,570,405

EXIT CONE PYROGEN ROCKET IGNITER

BACKGROUND OF THE INVENTION

This invention relates to the ignition of the main propellant charge of a solid propellant rocket motor and, more particularly, to an apparatus for initiating such ignition.

The reliable ignition of the main propellant charge of a solid propellant rocket motor is, obviously, of the utmost importance. Such ignition is often a complex problem. In fact, in high altitude, low chamber firings, such as 100 p.s.i. or lower, it is often difficult to achieve any reliable means of ignition. These problems become particularly acute where the main propellant charge of the rocket motor is of the restricted type having end burning grains, since the initial main chamber volume is at a minimum. The problems are further increased and aggravated where there is a requirement for "soft ignition," i.e., gradual pressure rise.

In addition, current state of the art pyrogen-type igniters require pressure chambers, resulting in added weight and increased cost.

Further, burst discs have been known to rupture prematurely, i.e., prior to ignition of the main propellant charge.

My invention, a novel igniter assembly, obviates these problems.

SUMMARY OF THE INVENTION

My invention provides for the reliable ignition of the main propellant charge, of the restricted end burning type, of solid propellant rocket motors.

Therefore, an object of this invention is to reliably ignite the main propellant charge of the solid propellant rocket motor.

Another object of the invention is to eliminate the need for an ignition pressure chamber and, thus, provide a saving in both weight and cost.

Still another object of this invention is to require the burst disc to rupture only after the main propellant charge has been ignited.

These, and further, objects of my invention will become readily apparent after a consideration of the description of my invention and of the drawing.

DESCRIPTION OF THE DRAWING

The drawing is a side elevation view in cross section, of a schematic representation of an embodiment of my invention.

DESCRIPTION OF A PREFERRED EMBODIMENT

In the drawing are shown a preferred embodiment of my pyrogen rocket igniter assembly 10, rocket nozzle assembly 20, and, in partially fragmented form, solid propellant rocket motor assembly 30.

That portion of rocket motor assembly 30 which is shown includes casing 31, combustion chamber 32, and solid main propellant charge 33.

Rocket nozzle assembly 20 shown includes throat area 21, divergent section casing 22, chamber portion 23, and exit 24.

The embodiment shown of my pyrogen rocket igniter assembly 10 includes electric type igniter initiator 11 with leads 12, igniter initiator charge 13 of the pyrotechnic type, an igniter charge 14 of the solid grain type having a centrally located port 15, and a burst disc 16 with a plurality of ports 17 therein.

It is to be noted that igniter charge 14 is bonded, in the preferred embodiment, to burst disc 16; that burst disc ports 17 are of the same area and, in the preferred embodiment, that there are three of them, each equidistant from each other; that rocket igniter assembly 10 fits within, and is internal of, rocket nozzle assembly 20 at the aft end, i.e., exit 24; and that solid main propellant charge 33 is of the restricted end burning type.

MODE OF OPERATION OF THE EMBODIMENT

With reference to the drawing, when leads 12 are energized by suitable means, igniter initiator 11 ignites pyrotechnic charge 13 which, in turn, ignites the internal surface, i.e., the periphery of centrally located port 15, of solid grain igniter charge 14. The gases resulting from this combustion flow back, i.e., aft, toward burst disc 16 and ports 17. Specifically, the gases flow out of the forward exit of port 15; circulate in and around rocket nozzle chamber 23 toward burst disc 16 and ports 17; and ignite the outer surfaces of solid grain igniter charge 14.

The combustion reaches equilibrium in the rocket nozzle chamber 23, which acts as the igniter chamber. The pressure therein remains constant due to the fixed area of the burst disc ports 17 and the constant area grain design of charge 14.

During the entire time since the initiation of ignition, solid main propellant charge 33 has been, and continues to be, subjected to the hot combustion gases, radiant energy, and hot solid particles of solid grain igniter charge 14 and is pressurized to a level at which combustion readily occurs.

As main propellant charge 33 becomes ignited, it contributes mass flow rate to the igniter gases and, therefore, the total flow rate through burst disc ports 17 increases. Since the area of each of burst disc ports 17 is constant, the pressure continues to rise in rocket motor assembly combustion chamber 32 and nozzle chamber 23 proportionally with the increased flow of gases from the combustion of main propellant charge 33.

When the pressure in rocket motor assembly combustion chamber 32 reaches the preselected rupture level of burst disc 16, said disc 16 ruptures, ejects from nozzle chamber 23 through exit 24, and takes with it the entire rocket igniter assembly 10.

The instantaneous pressure differential across nozzle throat area 21 immediately establishes sonic flow.

While there has been shown and described the fundamental features of my invention, as applied t a preferred embodiment, it is understood that various substitutions and omissions may be made by those skilled in the art without departing from the spirit of the invention. For example: if the main propellant charge is of the internal burning-type, type, rather than the end burning type shown in the drawing, a blowout insert within the main throat area would be used to reduce igniter rise time and reduce ignition delay.

I claim:

1. An apparatus for igniting the main propellant charge of a solid propellant type rocket motor having a divergent-type nozzle, comprising:
   a. a burst disc having a plurality of ports therein, with said burst disc rupturable at a preselected pressure and affixed to, and wholly within, the exit portion of the divergent-type nozzle of the rocket motor;
   b. an igniter charge of the solid grain-type having a centrally located port, with said igniter charge bonded to the inner surface of said burst disc and located within the exit portion of the divergent-type nozzle of the rocket motor;
   c. an electric type igniter initiator having leads attached thereto, said igniter initiator being located within the centrally located port of said igniter charge at the interface with said burst disc, and said leads passing through said burst disc and external to the exit portion of the divergent-type nozzle of the rocket motor;
   d. an igniter initiator charge of the pyrotechnic type surrounding said electric type igniter initiator, with said initiator charge located within the central port of said igniter charge; and
   e. means for activating said electric type igniter initator, by applying an electrical current through the leads thereto, thereby igniting said igniter initiator charge and said igniter charge, causing the ignition of said main propellant charge of the rocket motor.